United States Patent
Kempers et al.

(10) Patent No.: US 8,426,622 B2
(45) Date of Patent: Apr. 23, 2013

(54) PROCESS FOR PRODUCTION OF FATTY ACIDS, FATTY ACID ESTERS AND STEROLESTERS FROM SOAPSTOCK

(75) Inventors: Peter Kempers, Mönchengladbach (DE); Ulrich Schörken, Düsseldorf (DE); Thomas Wolf, Haan (DE); Setsuo Sato, Vila Ema (BR); Wanderson Bueno de Almeida, São José dos Campos (BR); Pablo Silva Bizzarri, Centro Jacarei (BR); Alexssander Shigueru Araujo, São José dos Campos (BR)

(73) Assignee: Cognis IP Management GmbH, Duesseldorf (DE)

( * ) Notice: Subject to any disclaimer, the term of this patent is extended or adjusted under 35 U.S.C. 154(b) by 865 days.

(21) Appl. No.: 12/307,676

(22) PCT Filed: Jun. 27, 2007

(86) PCT No.: PCT/EP2007/005663
§ 371 (c)(1),
(2), (4) Date: Jan. 6, 2009

(87) PCT Pub. No.: WO2008/003420
PCT Pub. Date: Jan. 10, 2008

(65) Prior Publication Data
US 2009/0186861 A1 Jul. 23, 2009

(30) Foreign Application Priority Data
Jul. 6, 2006 (EP) ..................................... 06013999

(51) Int. Cl.
*C11B 13/00* (2006.01)
*C11B 3/02* (2006.01)

(52) U.S. Cl.
USPC ........... 554/175; 554/174; 554/156; 554/157; 554/176; 554/195; 435/134; 435/135; 435/132; 435/198

(58) Field of Classification Search ........................ None
See application file for complete search history.

(56) References Cited

U.S. PATENT DOCUMENTS

| 2,758,122 | A | * | 8/1956 | Clayton | 552/545 |
| 4,052,425 | A | * | 10/1977 | Leonard | 554/175 |
| 4,217,279 | A | * | 8/1980 | Kaiser | 540/118 |
| 5,156,879 | A | | 10/1992 | Evans | |
| 5,677,160 | A | * | 10/1997 | Oester et al. | 435/198 |
| 5,763,383 | A | | 6/1998 | Hashida et al. | 510/392 |
| 6,281,373 | B1 | | 8/2001 | Sato et al. | |
| 6,398,707 | B1 | | 6/2002 | Wu et al. | |
| 6,423,857 | B1 | * | 7/2002 | Copeland et al. | 554/198 |
| 6,475,758 | B2 | | 11/2002 | Reaney | |
| 6,723,867 | B1 | | 4/2004 | Huebner et al. | |
| 6,989,456 | B2 | * | 1/2006 | Seo et al. | 552/544 |
| 2002/0009785 | A1 | | 1/2002 | Reaney | |
| 2002/0183298 | A1 | * | 12/2002 | Schersl et al. | 514/182 |
| 2003/0236422 | A1 | | 12/2003 | Daniels | |
| 2004/0166224 | A1 | * | 8/2004 | Mankura et al. | 426/601 |
| 2006/0084154 | A1 | | 4/2006 | Jones, Jr. et al. | |

FOREIGN PATENT DOCUMENTS

| EP | 0367473 A2 | 9/1990 |
| WO | 2005095565 A1 | 10/2005 |
| WO | 2006050589 A1 | 5/2006 |

OTHER PUBLICATIONS

Singh, S. et al., Thermomyes Lanuginosus: Properties of strains and theri hemicellulases, 2003, FEMS Microbiology Reviews, 27, pp. 3-16.*
Hass, M.J., et al., Enzymatic phosphatidylcholine hydrolysisin organic solvents: An examination of selected commerciallyavailable lipases, 1994, JAOCS, vol. 71, No. 5, pp. 483-490.*
Ghosh, S., et al., Utilizatin of acid oils in makdin gvaluable fatty products by microbial lipase technology, 1995, JACOS, vol. 72, No. 12, pp. 1541-1544.*
Davranov, K., et al., Current stae of the study of microbial lipases, 1997, Chemistry of Natural Compounds, vol. 33, No. 2, pp. 113-126.*
Voeste, T., et al., Production of fatty alcohols form fatty acids, 1984, JAOCS, vol. 61, No. 2, pp. 350-352.*
Tuter, M., et al., Synthesis of fatty acid esters form cid oils using lipase B from *Candida antarctica*, 2004, Euro. J. Lipid Sci. Technol., vol. 106, pp. 513-517.*
"Improving the economics of biodiesel production through the use of low value lipids as feed stocks: vegetable oil soapstock" Michael J. Haas Fuel Processing Technology 86 (2005) 1087-1096.

* cited by examiner

*Primary Examiner* — Yate K Cutliff
(74) *Attorney, Agent, or Firm* — Servilla Whitney LLC

(57) ABSTRACT

The invention relates to a process for production of fatty acids directly from soapstock generated in the alkali refining process including the steps of (a) adding a lipase directly to the alkaline soapstock to facilitate hydrolysis of glycerides without prior neutralization, (b) neutralizing and splitting the soaps with strong acids, and (c) separating the fatty acid phase from the aqueous phase by settling and/or centrifugation. A second embodiment is a process in which the soapstock is first neutralized and split with strong acids, followed by adding a lipase to facilitate glyceride hydrolysis, and separating the fatty acid phase. The fatty acids so obtained can be esterified with C1-C6 alcohols using a lipase that is selective for fatty acids and does not transesterify the sterolesters, and the fatty acid esters and sterolesters are separated by distillation.
The sterolesters are useful as supplements for food, as pharmaceutical agents for lowering cholesterol and as biofuel and biodiesel.

20 Claims, No Drawings

PROCESS FOR PRODUCTION OF FATTY ACIDS, FATTY ACID ESTERS AND STEROLESTERS FROM SOAPSTOCK

CROSS REFERENCE TO RELATED APPLICATIONS

This application is the National Phase entry of PCT/EP2007/005663, filed Jun. 27, 2007, which claims priority to European Patent Application number EP06013999, filed Jul. 6, 2006, both of which are incorporated herein by reference in their entireties.

FIELD OF INVENTION

This invention relates to processes which produces alkyl fatty acids, alkyl fatty acid esters and sterolesters via enzymatic catalysis using as feed soapstock waste generated by the vegetable oil refineries during the alkali refining process to produce edible oils. The combination of this technology with feedstock availability offers an economic and competitive approach to produce solvents, plastisicer from dimerised acids, biodiesel and/or material for the chemical industry. Additionally a new source of sterolesters is available for the food industry. Converting byproducts from renewable sources into more value added products using biotechnology is another real example of contributions from the chemical industry using more environmentally friendly practices.

BACKGROUND OF THE INVENTION

For each metric ton of alkali refined vegetable oil produced in the world approximately 30 kg of soapstock is generated. This is a high potential source of raw material since vegetable oil production is growing, specially soybean oil from Brazil.

Soapstock waste has been used mostly as animal feed, raw material for soap makers, and feed stock for fatty acid production. The existing patents and commercial processes to make fatty acids from soapstock always refers to hydrolysis and acidification steps using strong acids such as sulfuric or hydrochloric acids, producing a mixture of fatty acids, inorganic salts, water, and other small components such as glycerin and phospholipids. Due to the nature of this complex mixture, separation of the crude fatty acids layer representing the organic phase from the aqueous phase is difficult, generally requiring steps such as water washing, settling out, centrifuging, and filtration to separate the other components from the fatty acids. Some novelty has been introduced lately, for instance, the use of potassium soaps which generates lower viscosity feedstock, one of the biggest problem with sodium soaps, as described in the US patent publication 2003/0236422. Another patent disclosing a procedure to make fluid soapstock is described in the U.S. Pat. No. 5,156,879.

The invention is directed to a method for treatment of soapstock obtained by alkali refining of fats to provide a fluid, uniform, pumpable animal feed product. In the method, a raw soapstock is provided. The soapstock is pretreated by adding a strong, soluble base to the soapstock.

The U.S. Pat. No. 6,475,758 discloses the use of an endogenic bacteriaum to acidulate soapstock. It is advantageously acidified by fermentation of endogenous soapstock nutrients and added nutrients under controlled conditions using acidogenic bacteria. The nutrients may include carbohydrate, nitrogen, phosphorous, sulfur from defined or undefined sources. The acidification reaction avoids the use of strong acids for the treatment of soapstock, minimizes wastewater contamination with salts and produces potentially valuable by-products including lactic acid, acetic acid, glyceric acid and nutrient rich microorganisms.

All the above mentioned processes end up with a dark color crude fatty acid having residual moisture and other small molecular weight components. Drying and distillation steps usually are necessary to produce commercial fatty acids to be sold in the marketplace or to use it as esterification feed because impurities are known to lower the esterification reaction rate. Usually, alkaline soapstock is converted into free fatty acids by treatment with strong acids. Afterwards, the fatty acids and water/salts are separated.

The process described in WO 2006/050589 to produce fatty acid esters from soapstock deals with enzymatic esterification, with lipase, of the free fatty acids after acidification of the alkaline soapstock with strong acids. The conversion of triglycerides to fatty acids is not complete and the separation is difficult due to mono-/di-/triglycerides and phospholipids that act as emulsifiers. It was an object of the invention to optimize the conversion of glycerides to fatty acid and to increase the yield of free fatty acids of the soapstock. It was also an object of the invention to minimize the emulsifying effects of the mixture to improve separation steps.

DETAILED DESCRIPTION OF PREFERRED EMBODIMENTS

The subject of the invention is a process for production of fatty acids directly from any soapstock generated in the alkali refining process, comprising:
a) adding a lipase directly to the alkaline soapstock to facilitate hydrolysis of mono-, di- and triglycerides without prior neutralization,
b) neutralizing and splitting the soaps with strong acids until reaching pH 1-6, preferably pH 4-6
c) separating the fatty acid phase from the aqueous by settling and/or centrifugation The soapstocks typically contain 10-60% water- and 35-85% of fatty acid derivatives including partial glycerides and phospholipids.

Soapstocks usually have 10-60% of water coming from alkali neutralization, and most refineries add extra water to make the soaps pumpable, the remainder being composed of the fatty acid soaps, 0.1-2% sterols, mono-, di- and triglycerides and also low level of phospholipids. Some feedstocks also contain proteins coming from the extraction process which would end up as a solid material in the process.

In a preferred embodiment the invention deals with a process where the soapstocks from alkali refining are selected from the group consisting of soybean, sunflower, rice, corn, coconut, palm kernel, rapeseed and cotton.

The advantage of this process is the addition of the lipase without any pretreatment of the alkaline soapstock to enrich the free fatty acids in the soaps before esterification. This reduces the alkali concentration and manages the waste water.

The process in a preferred embodiment is characterized in that an alkaline detergent lipase is used for hydrolysis of glycerides in the soapstock.

The residual mono-/di-/triglycerides in the soapstock are hydrolysed by addition of an alkaline-active lipase at pH>8. Essentially all known lipases are suitable for the hydrolysis of glycerides.

The possible lipases to be used in the process are produced by an organism selected from the group consisting of *Aspergillus niger, Aspergillus oryzea, Bacillus species, Candida albicans, Candida antarctica, Candida cylindracea, Candida glabrata, Candida maltosa, Candida parapsilosis, Candida lipolytica, Candida tropicalis, Candida*

*viswanathii, Chromobacterium viscosum, Geotrichum candidum, Issatchenkia orientalis (Candida krusei), Kluyveromyces marxianus (C. kefyr, C. pseudotropicalis), Mucor javanicus, Penicilium camenberti, Penicilium roqueforti, Pichia guilliermondii (Candida guilliermondii), Porcine pancreas, Pseudomonas cepacia, Pseudomonas fluorescens, Rhizomucor miehei, Rhizopus arrhizus, Rhizopus oryzae, Rhizopus niveus, Rhizopus javanicus* and *Thermomyces lanugenosus* and mixtures thereof each in the form of solution, solid or immobilisied enzyme, preferably solution or solid enzyme. It is also preferred that the alkaline detergent lipase is a lipase from *Thermomyces lanugenosus* or from *Pseudomonas alcaligenes*. Most preferably the *Thermomyces lanugenosus* emzyme is used. The lipases e.g. from *Thermomyces* or from *Pseudomonas alcaligenes* are optimally active at alkaline pH, e.g. for washing applications. The lipase from *Thermomyces* is preferably used in a concentration of 0.1% at temperatures of 3° C. Typical concentrations are 1 ppm to 3% at temperatures from 10-60° C. The lipase can be used in free or immobilized form, preferably it is used in the free form.

The invention also relates in a second embodiment to a process for production of fatty acids directly from any soapstock generated in the alkali refining process comprising:
  i) neutralizing and splitting the soaps with strong acids until reaching pH 1-6, preferably pH 4-6,
  ii) adding a lipase to facilitate mono-/di-/triglyceride hydrolysis,
  iii) separating the fatty acid phase from the aqueous phase by settling and/or centrifugation.

In this variation of the process the hydrolysis of the glycerides occurs preferably by addition of a non-regioselective lipase after neutralization of the alkaline soapstock.

The processes consists of hydrolysis of the mono-/di-/triglycerides either by addition of an alkaline lipase directly to the soapstock before neutralization, or in the second embodiment, by addition of a non-regioselective lipase after neutralizing and prior to separation.

This second embodiment of the invention deals with a process where the soapstocks from alkali refining are also selected from the group consisting of soybean, sunflower, rice, corn, coconut, palm kernel, rapeseed or cotton, and where the acids used to split the soaps are also strong acids like sulfuric acid or hydrochloric acids, and the preferred pH is pH 1-6, most preferably pH 5.

The residual mono-/di-/triglycerides in the soapstock are hydrolysed by addition of a non-regioselective lipase at a pH below 8. Essentially all known lipases are suitable for the hydrolysis of glycerides. The possible lipases to be used in the process are produced by an organism selected from the group listed before at the first embodiment of the invention and mixtures thereof. However, the lipases from *Candida rugosa (cylindracea)*, *Chromobacterium* or *Geotrichum* are preferred and well suited for the hydrolysis of triglycerides in this process, because they do not exhibit a regioselectivity. The lipase from *Candida rugosa* is used in a concentration of 0.02% at temperatures of 30°-45° C. Typical concentrations for each lipase could be 1 ppm to 1% at temperatures from 10-70° C. The lipase can be used in free or immobilized form, preferably it is used in the free form.

In a further preferred embodiment of both processes according to the invention the phospholipids are hydrolysed by addition of a phospholipase. The hydrolysis of glycerides and phospholipids leads to a higher yield of free fatty acids and the separation of fatty acid and water phase is improved. The fatty acids are separated and purified by distillation and used for e.g. dimerization.

The phospholipids in the soapstock are optionally hydrolysed by addition of 1 ppm to 1% of phospholipase before or after neutralization step b), or step i), to facilitate the hydrolysis of the lecithin. Principally all known phospholipases are suitable for the hydrolysis of phospholipids. The possible phospholipases to be used in the process are also produced by an organism selected from the group listed before for the lipases at the first embodiment of the invention and also mixtures thereof. For the process phospholipase from *Thermomyces lanuginosus* is preferred. The reaction is performed at 50-60° C. at pH 5-6. Typical ranges are from pH 3-7 and temperature from 20-70° C. The splitting of the phospholipids results in a higher yield of free fatty acid material due to generation of free fatty acids from the phospholipids and due to a facilitated separation without emulsifying phospholipids in the reaction mixture. The phospholipase may be used in free form or in immobilized form, whereby free form is preferred. Synergistic effects may be achieved by using enzymes with different specifications.

The free fatty acid phase is separated from the water phase by means of settling or centrifugation. The water phase contains glycerol, lyso-lecithin and salts from the neutralization reaction.

After the separation step, the fatty acid material can optionally be distilled. In a further preferred embodiment of the invention the distillation step is carried out by batch or continuous operation preferably by a thin film or wiped film evaporator. A continuous distillation is operated at 180° C.-260° C. at 1-10 mm Hg pressure, preferably 220° C. at 3 mm Hg.

These two processes according to the invention will make possible the use of soapstock in more added value applications, other than conventional animal feed and soap manufacturing. The hydrolysis by alkaline lipase as in the first process, or non-regioselective lipase as in the second embodiment of the invention can be performed in the presence of high amounts of water and other components other than fatty material. The final yield of fatty acids is improved. By using combinations of lipases and phospholipases, the process can be easily adapted to different raw materials, and the quality demands of the product. Another advantage of both processes is that the ease of separation of the aqueous phase and other impurities increases dramatically. The process yield is higher compared to fatty acid generation without the use of enzymes. As a consequence less waste is generated in these processes.

Another subject of the invention is the use of the free fatty acids produced according the processes pursuant to the invention, for enzymatic or chemical synthesis of C1 to C6 esters and/or for chemical dimerisation of the fatty acids. The preferred alcohol is a linear or branched C1 to C6 alcohol, preferably methanol or ethanol using batch or continuous techniques. Also preferred is the use of said free fatty acids as raw material for the production of surfactants, as raw material for fabric softeners, as raw material for conjugation, as raw material for technical ester production or as raw material for fatty acid ethoxylate production. Additionally the free fatty acids can be applied directly as foam inhibitors or boosters.

As a consequence this results in the next subject matter of the invention. This next subject matter is a process for obtaining sterolesters and/or fatty acid esters characterized in that the fatty acids obtained according to the processes for production of fatty acids directly from any soapstock, as described above are
  I) esterified with a C1 to C6 alcohol with a lipase that is selective for fatty acids and does not transesterify the sterolesters, and II) the fatty acid esters are separated from the sterolesters by distillation.

The free fatty acids resulting from the processes to produce fatty acids according to the invention are converted into C1-C6 alkyl esters, preferably methyl or ethyl esters by enzymatic conversion.

A lipase and the C1 to C6 alcohol are added. Essentially all known lipases are suitable for the synthesis of esters. The possible lipases to be used in the process are produced by an organism selected from the group listed before at the first embodiment of the invention and mixtures thereof. However, it is known that some lipases as e.g. *Candida rugosa* types are also capable of esterifying sterols. As lipases, preferably a lipase from *Thermomyces* or alternatively from *Candida Antarctica* type B is used. The lipase from *Thermomyces* is added in concentrations of 1 ppm to 5%, usually 0.1% is used. Reaction temperatures range from 15-70° C., depending on type of enzyme. An alcohol concentration of 1-50% is used for esterification; typically 5 to 15%. The conversion works also in the presence of water. Typically 60-95% conversion is obtained. The lipase may be used in free form or in immobilized form. An additional advantage of the *Thermomyces* and *Candida Antarctica* type B lipases is the high activity in a low-water environment even in the free form. Addition of the enzyme in the free form is preferred.

The obtained esters depend on the content of the free fatty acid material resulting from the alkaline soapstock. If soybean- or rapeseed oil is used as the basis for the soapstock, esters of palmitinic acid, stearic acid, oleic acid, linoleic acid and/or linolenic acid in different concentrations are obtained.

Surprisingly it was found that the pattern of the esters obtained from the soybean oil based soapstock are different from the fatty acid profile of soy. The esters contain less polyunsaturated fatty acids and therefore directly fit the requirements of the EU legislation for biodiesel fuel EN 14214, in contrast to esters obtained from soybean oil.

Additionally the oxidation problems experienced with Biodiesel from rapeseed oil are attributed mainly to the linolenic acid content in rapeseed oil of around 10%. Soybean oil has a similar content of linolenic acid. Surprisingly it was found that the linolenic acid content in the soapstock is significantly lower (3-4%), which results in a biodiesel fuel with an enhanced oxidation stability.

The residual free fatty acids remaining after enzymatic esterification are preferably turned into their ionic form by addition of a mineral base like KOH, NaOH or $Ca(OH)_2$ solution to prevent co-distillation with the esters. This results in a better separation of esters from residual fatty acids. Afterwards the mixture is separated in a distillation, preferred in a short path distillation. The sterolesters are enriched in the bottom phase, the methyl esters are enriched in the distillate.

The new process for obtaining sterolesters and/or fatty acid esters consists of a selective esterification of the fatty acids with lipase while leaving the sterolesters unchanged. The esters so produce, which correspond to 70-95% of the fatty acid residue, are separated by distillation, and sterolesters are enriched in the bottom fraction.

The sterolesters can be further purified by e.g. crystallization, extraction or fractional distillation. Sterolesters are the preferred form for human nutrition and not the free sterols. In a chemical process the sterolesters are transesterified at least partially into free sterols and fatty acid methyl esters.

A further preferred embodiment of the invention relates to the process for obtaining natural sterolesters and/or fatty acid esters whereby the lipase is a lipase of *Thermomyces*. Further preferred is this process wherein the unreacted fatty acids are transformed into their salts prior to distillation of the fatty acid esters.

As an advantage, the esterification at low temperatures simplifies the process and equipments. This gives the process high flexibility, allowing the use of existing manufacturing plants with minor changes. Capital investment is considerably lower for new plants using the process of the invention. The esterification process according to the invention allows the existence of small ester production plants near to the oil refineries saving handling and transportation cost.

The process generates concentrated sterolesters as a high-value product. The isolated sterolesters are mainly esters from sterols selected from the group consisting of beta-sitosterol, campesterol, stigmasterol and mixtures thereof. In soybean oil for example the amounts of the sterols are 54% beta-sitosterol, 18% campesterol, 15% stigmasterol and 5% mixtures of other sterols.

As a consequence of the process for obtaining sterolesters and/or fatty acid esters, further subject matters of the invention are the use of the sterolesters obtained by said process for animal feed, food, health foods and as pharmaceutical agents for lowering cholesterol, and/or as precursor for steroid synthesis. Usually chemical processes lead to the formation of free sterols, which have to be reesterified for use in food products. With the present process natural sterolesters are obtained, which can be used as supplement for food products directly after purification.

Another subject matter of the invention is the use of the fatty acid esters obtained by said process as solvent, for the production of fatty alcohols, as biofuel or biodiesel, as plasticer or for dimerization. Further embodied applications are the use of the methyl esters as raw materials for fatty alcohol production or for the production of surfactants such as sulfo esters or fabric softeners.

Biofuel produced in this way is suitable for biodiesel according to EN 14214 because the esters contain less polyunsaturated residues and therefore fit directly the EU legislation for biodiesel fuel EN 14214, in contrast to esters obtained from soybean oil.

The fatty acid esters according to the processes can be used as biodiesel with an improved oxidation stability, and as an additive for diesel or as 100% of the fuel for diesel engines.

EXAMPLES

Example 1

To 50 g alkaline soapstock from soybean, 10 g soybean oil was added. 50 µl of Lipolase 100 EX was stirred at 30° C. The triglyceride content was determined by gas chromatography and was 0% after 44 hrs reaction time.

Example 2

50 g neutralized soapstock from soybean, 6.25 g of methanol and 50 µl of Lipolase 100 EX was stirred at 30° C. The acid value of the reaction was determined. Starting acid value was 152, the acid value reached 15.0 after 30 hrs conversion. Methyl ester phase was separated by settling.

Example 3

50 g soapstock was spiked with 5 g lecithin and reaction was started by addition of 0.05 g phospholipase. Hydrolysis of lecithin was determined by TLC. After 18 hrs reaction time, no lecithin could be detected in the soapstock mixture.

Example 4

To 177 kg of alkaline soapstock, 75 g of lipase was added and stirred at 40° C. for 1.5 hrs. The initial triglyceride content was 27.5%. After hydrolysis, 3.2% triglycerides could be determined by gas phase chromatography. It was observed that the separation of oil and water phase was faster when the soapstock was treated with alkaline lipase.

Example 5

To 50 g neutralized soapstock from soybean, 5 g soybean oil was added. 5 mg of lipase from *Candida rugosa* was added and the mixture was stirred at 45° C. The triglyceride content was determined by gas chromatography and was 0.5% after 46 hrs reaction time.

Example 6

Acidified soapstock was adjusted to pH 4-5 with NaOH, 4% water and 250 ppm phospholipase was added and stirred for 8 hrs at 55° C. After this pre-treatment, enzymatic esterification with lipase and short chain alcohol was carried out according to example 2. The yield of the combined phospholipase and lipase treatment was 89.1% after separation compared to 80.4% without phospholipase treatment.

Example 7

Large scale alkaline enzymatic hydrolysis of soapstock and separation of oil and water phase. In a 85 m³ tank enzymatic hydrolysis of the soapstock was performed by addition of 0.1% Lipolase. The initial acid value of 124 rose to 170 after a hydrolysis time of 2 hours at 40° C.

Example 8

Distillation of fatty acid esters obtained from soapstock and analysis of the sterol content in the bottom fraction.

The soapstock has an average content of 2% sterols of which 80% are found in the form of sterolesters. A chemical esterification of the dried soapstock fatty acids was performed with zinc oxide as catalyst in a 20 m³ reactor to an acid value of 5. In parallel an enzymatic esterification of the soapstock with Lipolase was done in a 100 m³ tank to an acid value of 30.

The two esters where distilled and the bottom fractions were analyzed for their sterol content: In the distillation residue of the chemical esterification a total sterol content of 8.8% with a free sterol portion of 5.3% was found corresponding to a sterolester content of 40% in the sterol fraction. In the distillation residue of the enzymatical esterification a total sterol content of 4.6% with a free sterol portion of 0.95% was found corresponding to a sterolester content of 79%. From these results it can be seen that in the enzymatic esterification the sterolesters are not transesterified to a significant amount while in the chemically catalyzed esterification a significant part of the sterolesters are transesterified.

Example 9

Analysis of the distillate and comparison against soybean and rapeseed fatty acid profile. The EU biodiesel norm is adapted to the iodine value typically seen in rapeseed oil methyl esters with a maximum of 120.

| Fatty acid [%] | Soybean oil | Rapeseed oil | Ester from soybean soapstock |
|---|---|---|---|
| Palmitic | 10 | 5 | 16 |
| Stearic | 4 | 2 | 4 |
| Oleic | 22 | 60 | 22 |
| Linoleic | 53 | 22 | 39 |
| Linolenic | 9 | 10 | 4 |

Result: The esters obtained from the soapstock have a iodine value of 110, which is within the specification of the EN 24124 (120 specification limit). Additionally the low percentage of linolenic acid is positive because oxidation problems in biodiesel are especially attributed to the highly oxidation sensitive linolenic acid content.

If not indicated in another way, all amounts are in weight % related to the overall weight.

What is claimed is:

1. A process for production of fatty acids from soapstock generated in an alkali refining process comprising:
    a) adding a lipase to the alkaline soapstock to facilitate hydrolysis of mono-, di- and triglycerides present in the soapstock without prior neutralization,
    b) neutralizing and splitting of fatty acid soaps present in the soapstock with strong acids until reaching pH 1-6, and
    c) separating a fatty acid phase from an aqueous phase by settling and/or centrifugation, wherein the fatty acid phase comprises fatty acids and sterols that includes sterolesters.

2. The process of claim 1, wherein said lipase comprises an alkaline detergent lipase.

3. The process of claim 2, wherein said alkaline detergent lipase comprises a lipase obtained from the microorganism *Thermomyces lanuginosus*.

4. A process for production of fatty acids from soapstock generated in an alkali refining process comprising:
    i) neutralizing and splitting fatty acid soaps present in the soapstock with strong acids until reaching pH 1-6,
    ii) adding a lipase to facilitate hydrolysis of the mono, di-, triglyceride present in the soapstock, and
    iii) separating the fatty acid phase from an aqueous phase by settling and/or centrifugation, wherein the fatty acid phase comprises fatty acids and sterols that include sterolesters.

5. The process of claim 4, wherein said lipase comprises a non-regioselective lipase.

6. The process of claim 5, wherein said lipase comprises a lipase obtained from a microorganism of the genus *Candida* or *Geotrichum*.

7. The process of claim 1, further comprising adding a phospholipase before or after neutralization step 1b) to facilitate the hydrolysis of lecithin.

8. The process of claim 7, wherein said phospholipase comprises a phospholipase obtained from the microorganism *Thermomyces lanuginosus*.

9. A process for obtaining sterolesters and/or fatty acid esters from a fatty acid phase obtained from a soap stock, the process comprising:
    a) esterifying the fatty acids of the fatty acid phase obtained according to claim 1 with a C1 to C6 alcohol using a lipase that is selective for fatty acids to form fatty acid esters and does not transesterify the sterolesters to form fatty acid esters; and b) separating the fatty acid esters from the sterolesters by distillation to obtain an ester-enriched phase and a sterolester-enriched phase.

10. The process of claim 9, wherein said lipase comprises a lipase of *Thermomyces*.

11. The process of claim 9, wherein unreacted fatty acids are transformed into their salts prior to distillation of the fatty acid esters.

12. The process of claim 4, further comprising adding a phospholipase before or after neutralization step 4i) to facilitate the hydrolysis of lecithin.

13. The process of claim 12, wherein said phospholipase comprises a phospholipase obtained from the microorganism *Thermomyces lanuginosus*.

14. The method of claim 1, further comprising reacting at least one fatty acid with C1-C6 alcohols in the presence of an enzymatic or chemical esterification catalyst.

15. A method of claim 9, further comprising providing at least one natural sterolester from the sterolester-enriched phase for use in animal feed, food products for human consumption and/or health foods.

16. A method of claim 9, further comprising providing at least one natural sterolester from the sterolester-enriched phase for use in a cholesterol-lowering pharmaceutical composition.

17. A method of claim 9, further comprising using at least one sterolester as a chemical starting materials or intermediates in a synthesis sequence designed to produce steroids.

18. A method of claim 9, further comprising using at least one of the fatty esters as a starting materials for the synthesis of fatty alcohols.

19. A method of claim 9, comprising providing at least one fatty acid ester for use in biodiesel fuel, whereby said biodiesel fuel has improved oxidation stability over said biodiesel fuel without said fatty acid ester additive.

20. A method of claim 1, further comprising reacting at least one fatty acid with a catalyst to form dimer fatty acids.

\* \* \* \* \*